Dec. 9, 1958    R. H. JUST ET AL    2,863,561
STACKED DISK FILTER
Filed Jan. 20, 1955    2 Sheets-Sheet 1
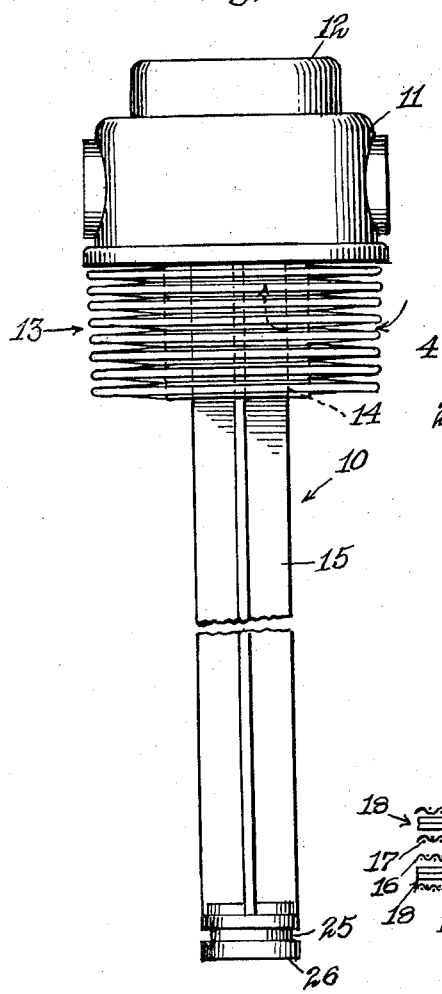
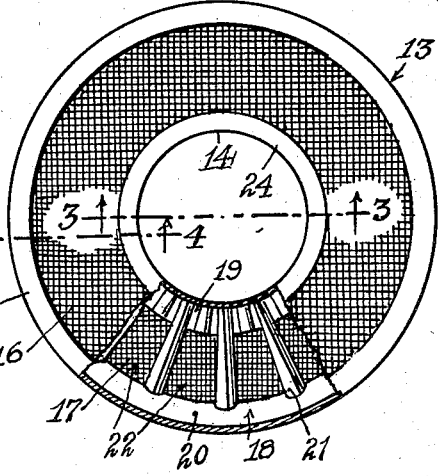
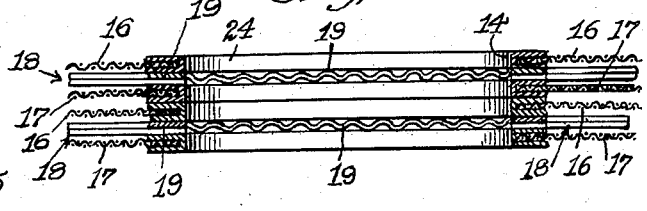
INVENTORS
Raymond H. Just and
Albert G. May
By Munn, Liddy, Nathanson & March
ATTORNEYS Dec. 9, 1958 R. H. JUST ET AL 2,863,561
STACKED DISK FILTER
Filed Jan. 20, 1955 2 Sheets-Sheet 2

INVENTORS
Raymond H. Just and
Albert G. May
BY Munn, Liddy, Nathanson & March
ATTORNEYS

United States Patent Office 2,863,561
Patented Dec. 9, 1958

2,863,561

STACKED DISK FILTER

Raymond H. Just and Albert Griffith May, Caldwell, N. J., assignors to Screen Products, Inc., Caldwell, N. J., a corporation of New Jersey Application January 20, 1955, Serial No. 482,923

18 Claims. (Cl. 210—347)

This invention relates to filters, and more particularly to stacked disk filters for filtering liquids such as oil and the like.

An object of the present invention is to provide a stacked disk filter for liquids having a large effective screening area.

A further object of the present invention is to provide a stacked disk filter for liquids having a large number of screens per unit length of stack without reducing the size of the flow path between the screens.

A still further object of the present invention is to provide a stacked disk filter for liquids which does not require indexing in the assembly thereof.

A still further object of the present invention is to provide a stacked disk filter for liquids which while having desirable operating characteristics, is of relatively small weight and size.

Yet another object of the present invention is to provide a stacked disk filter for liquids which has longevity, is durable, and whose periods between cleaning are longer.

Yet another and further object of the present invention is to provide a stacked disk filter for liquids having large filtering capacity and small pressure drop utilizing a greater range of meshes and being completely interchangeable with the stacked desk filters for liquids presently in use.

A feature of the present invention is the provision of a stacked disk filter for liquids having all of the desired advantages which is nevertheless inexpensive to manufacture and easy to produce and assemble.

Other objects and advantages are set forth in greater detail in the accompanying specification taken in conjunction with the accompanying drawings, in which:

Fig. 1 is a side view partially broken away of the stacked disk filter for liquids of the present invention showing some of the filtering elements in position;

Fig. 2 is a plan view partially in section of one of the filtering elements of the stacked disk filter for liquids of the present invention;

Fig. 3 is a section taken along the lines 3—3 of Fig. 2;

Fig. 4 is a section taken along the lines 4—4 of Fig. 2;

Figure 5:
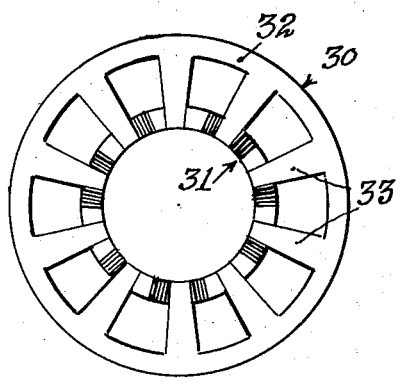
Fig. 5 is a plan view of a modified form of spacer used in the filtering element of the present invention.

Referring to the drawings, and more particularly to Figs. 1–4 thereof, only the actual filtering unit 10 itself is shown along with a chamber 11 having an outlet 12 from which the liquid passes after it is filtered. The filtering unit 10 and chamber 11 are normally disposed in a conventional housing, not shown, in any suitable and well-known manner. The housing has an inlet port near the base thereof for the introduction of the liquid to the filter whereupon after being filtered through the unit 10, the liquid passes into the chamber 11 and out of the outlet 12 for conventional use.

Heretofore various means have been proposed for providing stacked disk filters for filtering liquids and the like. However, various problems arose with the use of these filters because of the necessity to properly index the spacers, the blocking off of the screen area by the spacers, the development of leakage paths at the inner and outer perimeters and the necessity for cleaning the filters at relatively short intervals.

According to the present invention there has been provided a filter which overcomes the disadvantages set forth hereinabove and in addition provides certain new and novel features. The means for accomplishing these results comprise a plurality of annular filtering members 13, each having a central opening 14 in order that they may be stacked in face-to-face relationship with each other on a central member 15. As shown, the central member 15 comprises elongate strips secured together to form channels for the passage of the liquid after filtering, to the chamber 11 as hereinafter described.

It will be understood that the central member 15 is shown merely for exemplary purposes and that in some uses of the filtering member of the present invention the central member may be entirely eliminated or may consist of any means for conveying a liquid, such as for example a perforated tube or the like.

The annular filtering member of the present invention comprises two annular filtering screens 16 and 17 preferably of wire mesh disposed in superposed relation. A spacing member 18 is interposed between the filtering screens 16 and 17. The spacing member is preferably constructed of aluminum, although it will be understood that any other suitable material may be utilized.

As shown, the spacing member has an inner ring 19 and an outer ring 20. Ribs or strips 21 extend between and connect the inner ring 19 and the outer ring 20 of the spacing member. This construction provides intermediate open portions 22 between the ribs 21 and between the inner ring 19 and the outer ring 20. The ribs, as shown in Figs. 2–4, are reversely curved in cross-section. That is, the shape of the cross section is characterized by reverse bends in the manner of a flattened or elongated letter S. As shown, the inner ring 19 is crimped while the outer ring 20 is substantially flat. The ribs extending between the inner and outer rings, as shown in Fig. 2, are of relatively small height and depth near the flat outer ring 20 and gradually increase in height and depth towards the inner ring 19. Preferably the height of the reversible curved rib adjacent the outer ring 20 is substantially the same as the height of the outer ring, while the height of the rib adjacent the inner ring 19 is substantially the same as the height of the crimped inner ring.

A ferrule 23 secures together the outer peripheral edges of the screens 16 and 17 and the flat outer ring 20 of the spacer 18. The inner peripheral portions of each of the screens 16 and 17 are individually provided with sealing means in the form of a ferrule 24 binding the edges of the screens 16 and 17 separately. The ferrule 24 may be constructed of the same or a different material from the ferrule 23. The filtering member 13 is assembled in face-to-face relation with filtering members of similar construction on the central member 15, as shown. The sealing ferrules 24 of each filtering member abuts and is in sealing contact with the sealing ferrule of each of the adjacent filtering members. This sequence is followed over the entire length of the central member 15.

It will be understood that any suitable means may be provided to maintain the filtering members in position and under pressure so that a tight seal is effected between the respective sealing ferrules 24. For example, a clamp, not shown, may be tightened against the last filtering member, with the clamp extending around the groove 25 and the bushing 26.

It is to be noted that because of the construction of the filtering members there is no need for any indexing of the same in stacking them on the central member 15. With this construction the filtering members can only be stacked in one way; viz., the correct way. Further it has been found that there is provided an increased number of filtering screens per unit length of stack without reduction in size of the flow path between the screens. In addition, because of the elimination of a number of spacing members, the weight and size of the filter has been reduced while still maintaining desirable operating characteristics.

In the operation of the filtering unit of the present invention the oil will flow under pressure in the direction of the arrow shown in Fig. 1 between the filtering members. The gradual increasing height of the spacer 18 towards the central portion of the filtering member as hereinbefore described, permits the outer perimeter of each of the filtering members to remain apart from the adjacent filtering members while the inner perimeter thereof abuts and forms a seal-tight contact. The liquid to be filtered is thereby prevented from entering directly into the central member by the seal-tight contact of the sealing ferrules 24. The liquid is therefore caused to seek a path either upward or downward through the filtering screens 16 or 17 whereupon the filtering operation takes place. The outside pressure of the oil from the direction of the arrow entering the unit is such as to thereafter cause the liquid to pass above or below the crimped inner ring 19 of the spacer and into the central member.

It is to be noted that in operation the adjacent filtering members function as a pair; viz., the inner ferrules 24 of the adjacent filtering members cooperating to prevent the flow of liquid to the central member and causing the liquid to pass into one or the other of the adjacent filtering members for filtering and passage to the central member.

In Fig. 5 there is shown a modified form of spacer to be utilized in the filter of the present invention. The spacer 30 consists of a crimped inner ring 31 and a flat outer ring 32. The strips or ribs 33 extending between the crimped inner ring and the flat outer ring are flat throughout the entire length of the ribs. It has been found that the difference in height between the crimped inner ring and the flat outer ring provides for an effective operation of the filter in virtually the same manner as described hereinabove with reference to Figs. 1–4.

Figure 6:
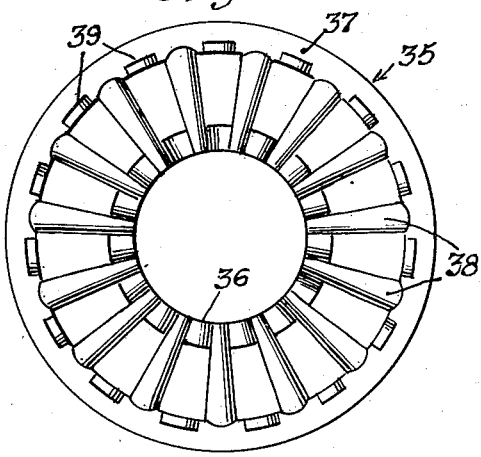
Fig. 6 is a plan view of still another modified form of spacer used in the filter of the present invention.

In Fig. 6 still another modification of the spacer utilized in the filter of the present invention is shown. The spacer 35 comprises a crimped inner ring 36 and a flat outer ring 37. The ribs 38 extending between the inner and outer rings are concave in shape when viewed from one side thereof and convex when viewed from the other side thereof. The ribs 38 are preferably graduated in height from a relatively small height near the outer perimeter to a relatively larger height near the inner perimeter approximately matching, at adjacent points, the height of the outer ring 37 and the inner ring 36 respectively. In this modification the inner periphery of the outer ring 37 is provided with knobs 39. The knobs 39 provide raised surfaces which are on the same level as the high portions of the convex ribs 38 and therefore aid the ribs in their support of a screen element, as will be readily understood. The knobs 39 thus aid in supporting and maintaining under tension the screens extending thereover so that said screens are maintained with an even surface.

Figure 7:
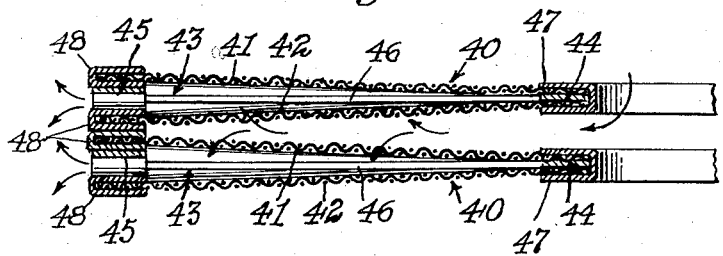
Fig. 7 is a section of still another modified form of filtering element according to the present invention.

In Fig. 7 there is shown a modified form of filtering member to be utilized when a reverse direction of the flow of the liquid is necessary. In this modification the filter 40 also comprises a pair of annular filtering screens 41 and 42 disposed in superposed relation. A spacing member 43 is interposed between the screens. In this form the spacing member consists of an inner ring 44 and an outer ring 45. The inner ring is flat while the outer ring 45 is crimped. Ribs or strips 46 extend between and connect the inner and outer rings. As shown, the ribs are reversely curved in cross-section, (that is, the shape of the cross section is characterized by reverse bends in the manner of a flattened or elongated letter S) and increase in height and depth from a point adjacent the inner ring to a point adjacent the outer ring. Preferably the ribs 46 are of substantially the same height as the flat inner ring at a point adjacent the same end of substantially the same height and depth as the crimped outer ring at a point adjacent the outer ring.

A ferrule 47 secures together the inner peripheral edges of the screens 41 and 42 together with the inner ring 44 of the spacer. The outer peripheral portions of each of the screens 41 and 42 are individually provided with sealing means in the form of a ferrule 48. The filter members 40 are assembled in face-to-face relation with adjacent filter members. The sealing ferrules 47 of each adjacent filter member abut the seal-tight engagement of the sealing ferrules of adjacent filtering members.

In operation the oil or liquid to be filtered will pass from the central member in the direction shown by the arrows in Fig. 7. The gradual increasing height of the spacer towards the outer portion as hereinbefore set forth enables the inner perimeter of adjacent filter members to remain apart while the outer perimeters thereof abut. The liquid is therefore prevented from passing directly out into the housing by the abutting engagement of the sealing ferrules 47. The liquid is therefore caused either to go upward or downward through the screen whereupon the filtering operation takes place and the pressure of the oil from the central member causes the liquid to pass above or below the crimped outer ring 45 into the housing.

It will be understood that various modifications of the spacer of this modified form of the present invention may be utilized. The ribs 46 may be flat or they may be concave in shape if desired.

It has been found that with the use of the filter of the present invention including the elimination of a complete sheet metal spacer and the provision of cut-out portions 21, the effective screening area is vastly increased for filtering purposes and there is therefore a resultant longer life of the filter between cleaning. Because of the elimination of blockage, there is present an increased filtering capacity and a decrease in pressure drop as compared to units of the same size. Further in assembly and after cleaning, error is prevented in the actual stacking or restacking of the filtering members around the central members.

In some filters of the prior art, leakage paths developed between the screens and the spacer preventing the use of a great range of meshes in the filtering screens. With the use of the filter of the present invention a great range of meshes may be utilized in the construction of the filtering screens because of the elimination of these leakage paths. It is further to be noted that if the path of flow is blocked off for any reason in one filter member, the liquid is not restricted to any particular channel, but will seek a new path in the same filter or travel upwardly or downwardly to the adjacent filter for passage to the central member.

Heretofore in filters of other construction the filter member had to be completely disassembled or with other constructions could not be effectively cleaned. In cleaning the filter of the present invention it is not necessary to take the filter member 13 completely apart but rather it may be cleaned by blowing across the same with air or with a liquid. The cleaning operation is therefore made comparatively easy with the present invention.

While the invention has been described in some detail, it will be understood that variations and modifications may be made without departing from the spirit thereof or the scope of the appended claims.

We claim:

1. A filtering member comprising a pair of fine-mesh annular filtering screens disposed in superposed relation; a spacing member interposed between and adapted to engage the screens; means securing together one set of the peripheral edges of the filtering screens and spacing member; annular rigid, screen-gripping and supporting sealing means attached to the other peripheral edge of each filtering screen, said spacing member comprising a substantially flat sheet metal annulus having openings therein, having radial portions of tapered effective thickness, and having a crimped peripheral portion spacing apart the adjacent other peripheral edges of the filtering screens.

2. A filtering member comprising a pair of fine-mesh annular filtering screens disposed in superposed relation; a spacing member interposed between and adapted to engage the screens; means securing together one set of the peripheral edges of the filtering screens and spacing member; annular rigid, screen-gripping and supporting sealing means attached to the other peripheral edge of each filtering screen, said spacing member comprising a substantially flat sheet metal annulus having relatively large openings therein, having radial portions of tapered effective thickness, and having a crimped peripheral portion spacing apart the adjacent peripheral edges of the filtering screens.

3. A filtering member comprising a pair of fine-mesh annular filtering screens disposed in superposed relation; a spacing member interposed between and adapted to engage the screens, said spacing member and said filtering screens having central openings; means securing together one set of the peripheral edges of the filtering screens and spacing member; annular rigid, screen-gripping and supporting sealing means attached to the other peripheral edge of each filtering screen, said spacing member comprising a substantially flat sheet metal annulus having openings therein, having radial portions of tapered effective thickness, and having a crimped peripheral portion spacing apart the adjacent peripheral edges of the filtering screens.

4. A filtering member comprising a pair of fine-mesh annular filtering screens disposed in superposed relation; a spacing member interposed between and adapted to engage the screens; means securing together the outer peripheral edges of the filtering screens and spacing member; an annular rigid, screen-gripping and supporting sealing means attached to the inner peripheral edges of each filtering screen, said spacing member comprising a substantially flat sheet metal annulus having relatively large openings therein, having radial portions of tapered effective thickness, and having a crimped inner peripheral portion spacing apart the adjacent peripheral edges of the filtering screens.

5. A filtering member comprising a pair of fine-mesh annular filtering screens disposed in superposed relation; a spacing member interposed between and adapted to engage the screens; means securing together the outer peripheral edges of the filtering screens and spacing member; an annular rigid, screen-gripping and supporting sealing means attached to the inner peripheral edges of each filtering screen, said spacing member comprising a substantially flat sheet metal annulus having openings therein, having radial portions of tapered effective thickness, and having a crimped inner peripheral portion, an outer peripheral portion and ribs extending therebetween and constituting the said radial portions.

6. The invention as defined in claim 5 in which said ribs are reversely curved in cross-section.

7. The invention as defined in claim 6 in which said ribs are of gradually increasing height and depth from the outer peripheral portion to said inner peripheral portion.

8. The invention as defined in claim 5 in which said ribs are substantially flat.

9. The invention as defined in claim 5 in which said ribs are concave.

10. The invention as defined in claim 5 in which said outer peripheral portion of said spacing member is provided with knobs.

11. A filtering member comprising a pair of fine-mesh filtering screens disposed in superposed relation; a spacing member interposed between and adapted to engage the screens; means securing together the inner peripheral edges of the filtering screens and spacing member; an annular rigid, screen-gripping and supporting sealing means attached to the outer peripheral edges of each filtering screen, said spacing member comprising a substantially flat sheet metal annulus having openings therein and having a crimped outer peripheral portion spacing apart the adjacent peripheral edges of the filtering screens.

12. A filtering member comprising a pair of fine-mesh filtering screens disposed in superposed relation; a spacing member interposed between and adapted to engage the screens; means securing together the inner peripheral edges of the filtering screens and spacing member; an annular rigid, screen-gripping and supporting sealing means attached to the outer peripheral edges of each filtering screen, said spacing member comprising a substantially flat sheet metal annulus having relatively large openings therein and having a crimped outer peripheral portion spacing apart the adjacent peripheral edges of the filtering screens.

13. A filtering member comprising a pair of fine-mesh annular filtering screens disposed in superposed relation; a spacing member interposed between and adapted to engage the screens; means securing together the inner peripheral edges of the filtering screens and spacing member; an annular rigid, screen-gripping and supporting sealing means attached to the outer peripheral edges of each filtering screen, said spacing member comprising a substantially flat sheet metal annulus having relatively large openings therein and having a crimped outer peripheral portion, an inner peripheral portion and ribs extending therebetween.

14. A filter comprising two pairs of fine-mesh filtering members, each pair comprising a pair of annular filtering screens, the screens of each pair being disposed in superposed relation; a pair of annular spacing members, one spacing member being disposed between each pair of filtering members; means securing together one set of the peripheral edges of the filtering screens and spacing members; a separate annular sealing means attached solely to the outer peripheral edges of each filtering screen, said annular sealing means directly engaging each other and sealing the edges of adjacent screens of the pairs and preventing passage of liquid therebetween.

15. A filter comprising two pairs of fine-mesh filtering members, each pair comprising a pair of annular filtering screens, the screens of each pair being disposed in superposed relation; a pair of annular spacing members, one spacing member being disposed between each pair of filtering members; a plurality of means securing together the sets of the outer peripheral edges of the filtering screens and spacing members; a separate annular sealing means attached solely to the inner peripheral edges of each filtering screen, said annular sealing means directly engaging each other and sealing the edges of adjacent screens of the pairs and preventing passage of liquid therebetween.

16. A filter comprising two pairs of fine-mesh filtering members, each pair comprising a pair of annular filtering screens, the screens of each pair being disposed in superposed relation; a pair of annular spacing members, one spacing member being disposed between each pair of filtering members; means securing together one set of the outer peripheral edges of the filtering screens and spacing members; a separate annular sealing means attached solely to the inner peripheral edges of each filtering screen, said annular sealing means directly engaging each other and sealing the edges of adjacent screens of the pairs and preventing passage of liquid therebetween, said spacing member comprising a substantially flat annulus having relatively large openings therein and having a crimped inner peripheral portion, an outer peripheral portion and ribs extending therebetween.

17. A filter comprising two pairs of fine-mesh filtering members, each pair comprising a pair of annular filtering screens, the screens of each pair being disposed in superposed relation; a pair of annular spacing members, one spacing member being disposed between each pair of filtering members; means securing together one set of the inner peripheral edges of the filtering screens and spacing members; a separate annular sealing means attached solely to the outer peripheral edges of each filtering screen, said annular sealing means directly engaging each other and sealing the edges of adjacent screens of the pairs and preventing passage of liquid therebetween.

18. A filter comprising two pairs of fine-mesh filtering members, each pair comprising a pair of annular filtering screens, the screens of each pair being disposed in superposed relation; a pair of annular spacing members, one spacing member being disposed between each pair of filtering members; means securing together one set of the inner peripheral edges of the filtering screens and spacing members; a separate annular sealing means attached solely to the outer peripheral edges of each filtering screen, said annular sealing means directly engaging each other and sealing the edges of adjacent screens of the pairs and preventing passage of liquid therebetween, said spacing member having an outer peripheral portion, an inner peripheral portion and ribs extending therebetween.

References Cited in the file of this patent

UNITED STATES PATENTS

| | | |
|---|---|---|
| 2,444,147 | Walton | June 29, 1948 |
| 2,473,979 | Walton | June 21, 1949 |
| 2,788,901 | Boeddinghaus et al. | Apr. 16, 1957 |

FOREIGN PATENTS

| | | |
|---|---|---|
| 878,867 | France | Feb. 8, 1943 |
| 951,478 | France | Oct. 26, 1949 |
| 827,352 | Germany | Jan. 10, 1952 |
| 827,648 | Germany | Jan. 10, 1952 |
| 905,969 | Germany | Mar. 8, 1954 |